US009615175B2

(12) United States Patent
Georgi et al.

(10) Patent No.: US 9,615,175 B2
(45) Date of Patent: Apr. 4, 2017

(54) METHOD OF FREQUENCY ASSIGNMENT OF A WIRELESS RADIO TRANSMISSION SYSTEM AND A WIRELESS RADIO AUDIO TRANSMISSION SYSTEM

(71) Applicant: Sennheiser electronic GmbH & Co. KG, Wedemark (DE)

(72) Inventors: Sebastian Georgi, Langenhangen (DE); Axel Schmidt, Wedemark (DE)

(73) Assignee: Sennheiser electric GmbH & Co. KG, Wedemark (DE)

( * ) Notice: Subject to any disclaimer, the term of this patent is extended or adjusted under 35 U.S.C. 154(b) by 288 days.

(21) Appl. No.: 14/036,103

(22) Filed: Sep. 25, 2013

(65) Prior Publication Data

US 2014/0119562 A1    May 1, 2014

(30) Foreign Application Priority Data

Sep. 26, 2012  (DE) .......................... 10 2012 217 473

(51) Int. Cl.
*H04B 5/00* (2006.01)
*H04R 3/12* (2006.01)
*H04W 72/04* (2009.01)

(52) U.S. Cl.
CPC ............. *H04R 3/12* (2013.01); *H04B 5/0006* (2013.01); *H04R 2420/07* (2013.01); *H04W 72/046* (2013.01); *H04W 72/0453* (2013.01)

(58) Field of Classification Search
USPC .... 381/77, 79, 58, 92, 81; 455/452.1, 67.11, 455/509
See application file for complete search history.

(56) References Cited

U.S. PATENT DOCUMENTS

| 6,032,045 A | 2/2000 | Mimura | |
| 9,071,913 B2* | 6/2015 | Koch | ...................... H04H 20/61 |
| 2003/0157916 A1* | 8/2003 | Kamimura | ................ H04L 5/06 455/313 |

(Continued)

FOREIGN PATENT DOCUMENTS

| DE | 10 2005 054 258 | 5/2007 |
| DE | 10 2009 046 544 | 5/2011 |
| DE | 10 2009 046 548 | 5/2011 |

*Primary Examiner* — Disler Paul
(74) *Attorney, Agent, or Firm* — Frommer Lawrence & Haug LLP

(57) ABSTRACT

There is provided a method of frequency assignment of wireless radio audio transmission systems having a plurality of wireless transmitters and at least one wireless receiver. The wireless transmitters can represent first wireless transmitters which in the switched-on condition can approach another wireless transmitter below an established minimum spacing and second wireless transmitters which in the switched-on condition cannot approach below the minimum spacing. The wireless transmitters serve for example to transmit an audio signal wirelessly to the at least one wireless receiver. The transmission frequencies of the first wireless transmitters are assigned having regard to possible intermodulation effects. The transmission frequencies of the second wireless transmitters are assigned having regard to the relative spatial distances of the second wireless transmitters relative to each other.

10 Claims, 2 Drawing Sheets

(56) References Cited

U.S. PATENT DOCUMENTS

| | | | |
|---|---|---|---|
| 2007/0117580 A1* | 5/2007 | Fehr | H03J 1/0075 455/509 |
| 2011/0249831 A1* | 10/2011 | Bellamy | H04B 7/0874 381/94.1 |
| 2012/0165031 A1 | 6/2012 | Fehr | |
| 2012/0258751 A1* | 10/2012 | Koch | H04H 20/61 455/509 |
| 2012/0281848 A1* | 11/2012 | Koch | H04R 29/00 381/58 |
| 2014/0254810 A1* | 9/2014 | Abramsky et al. | 381/58 |

* cited by examiner

METHOD OF FREQUENCY ASSIGNMENT OF A WIRELESS RADIO TRANSMISSION SYSTEM AND A WIRELESS RADIO AUDIO TRANSMISSION SYSTEM

The present application claims priority from German Patent Application No. DE 10 2012 217 473.7 filed on Sep. 26, 2012, the disclosure of which is incorporated herein by reference in its entirety.

1. FIELD OF THE INVENTION

The present invention concerns a method of frequency assignment of a wireless audio transmission system and a wireless radio audio transmission system.

It is noted that citation or identification of any document in this application is not an admission that such document is available as prior art to the present invention.

Wireless radio audio transmission systems are for example wireless microphone transmission systems having a plurality of wireless microphones which communicate with a wireless receiver and transmit the detected audio signals to the wireless receiver. The microphones typically have non-linear transmitting amplifiers, which can have the result that intermodulation of two wireless microphones can occur (intermodulation frequencies at $f_{11}=2\ f_1-f_2$ and at $f_{12}=2f_2-f_1$, wherein $f_1$ and $f_2$ represent the transmitting frequency), insofar as the two wireless microphones are operated at a small spatial spacing. The intermodulation products can then result in an adverse effect on the wireless transmission of further wireless microphones.

To avoid the adverse effect on transmission due to an intermodulation each wireless microphone is viewed as a possible source of intermodulation and frequency planning involves assigning to the respective wireless microphones transmission frequencies which take account of the intermodulation products of all other wireless microphones, that is to say the transmitting frequencies are so selected that the intermodulation products can never fall on those transmitting frequencies.

On the other hand a regulation in the recent years resulted in the frequency resources being limited in particular in the UHF (ultra-high frequency) band.

In the patent application from which priority is claimed the German Patent and Trade Mark Office searched the following state of the art: DE 10 2005 054 258 A1, DE 10 2009 046 544 A1, DE 10 2009 046 548 A1, US 2003/0157916 and U.S. Pat. No. 6,032,045 A.

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

It is further noted that the invention does not intend to encompass within the scope of the invention any previously disclosed product, process of making the product or method of using the product, which meets the written description and enablement requirements of the USPTO (35 U.S.C. 112, first paragraph) or the EPO (Article 83 of the EPC), such that applicant(s) reserve the right to disclaim, and hereby disclose a disclaimer of, any previously described product, method of making the product, or process of using the product.

SUMMARY OF THE INVENTION

Thus an object of the present invention is to improve a method of frequency assignment of wireless radio audio transmission systems and a wireless radio audio transmission system in regard to efficient utilization of the frequency resources.

Thus there is provided a method of frequency assignment of wireless radio audio transmission systems having a plurality of wireless transmitters with at least non-linear transmitting amplifier and at least one wireless receiver. The wireless transmitters can represent first or second wireless transmitters. The first wireless transmitters in the switched-on condition can approach another wireless transmitter below an established minimum spacing. The second wireless transmitters in the switched-on condition cannot approach another wireless transmitter below the minimum spacing. The wireless transmitters serve for example to transmit an audio signal wirelessly to the at least one wireless receiver. The transmission frequencies of the first wireless transmitters are assigned having regard to possible intermodulation effects. The transmission frequencies of the second wireless transmitters are assigned having regard to the relative spatial distances of the two wireless transmitters relative to each other.

Because the relative positions of the second (stationary) wireless transmitters (optionally also having regard to the temporal aspects) relative to each other are known it is possible to dispense with taking account of the intermodulation problems if a minimum spacing between two adjacent wireless transmitters is present or is maintained. In that way in particular the selection of the usable frequencies for the second (stationary) wireless transmitters can be improved as more frequencies are available.

According to the invention the spatial position of the wireless transmitters and/or the radius of action of a wireless transmitter (optionally also having regard to the temporal aspects) are established. It is then possible to establish the required transmission frequencies, in which respect consideration is given to whether there is a minimum spacing between the wireless transmitters. If that is the case then the transmission frequencies can be established or allocated without having regard to the intermodulation problems.

According to an aspect of the present invention the wireless transmitters like for example wireless microphones can be divided up into groups and frequency assignment can be implemented to correspond to the group division.

The invention concerns the notion, in the assignment of possible transmission frequencies in a radio audio transmission system (for example a wireless microphone transmission system) of checking whether two wireless transmitters can spatially approach each other (at the same moment in time) in the switched-on condition. If the transmitters in the switched-on condition can approach closer to each other below a minimum spacing, then the possible intermodulation frequencies have to be excluded in terms of frequency assignment. If however two wireless transmitters cannot simultaneously spatially approach each other in the switched-on condition then the intermodulation frequencies (which otherwise are not allocated) can also be used as possible frequencies for audio transmission. That can be effected as it is ensured that those wireless transmitters cannot spatially approach each other in such a way that intermodulation frequencies can be produced. In establishing whether wireless transmitters can spatially approach other wireless transmitters it is also possible to take account of a temporal component or a temporal aspect. If for example a wireless transmitter can be disposed at the same position as another wireless transmitter only at a later moment in time then intermodulation of the frequencies of the two wireless transmitters can be excluded so that the frequency at which intermodulation can occur can then be used as a transmission frequency.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

The present invention concerns a method of frequency assignment of a wireless radio audio transmission system and a wireless radio audio transmission system having wireless transmitters which have non-linear transmitting terminals so that intermodulation products can be generated if two of the transmitters come spatially closer.

Figure 1:
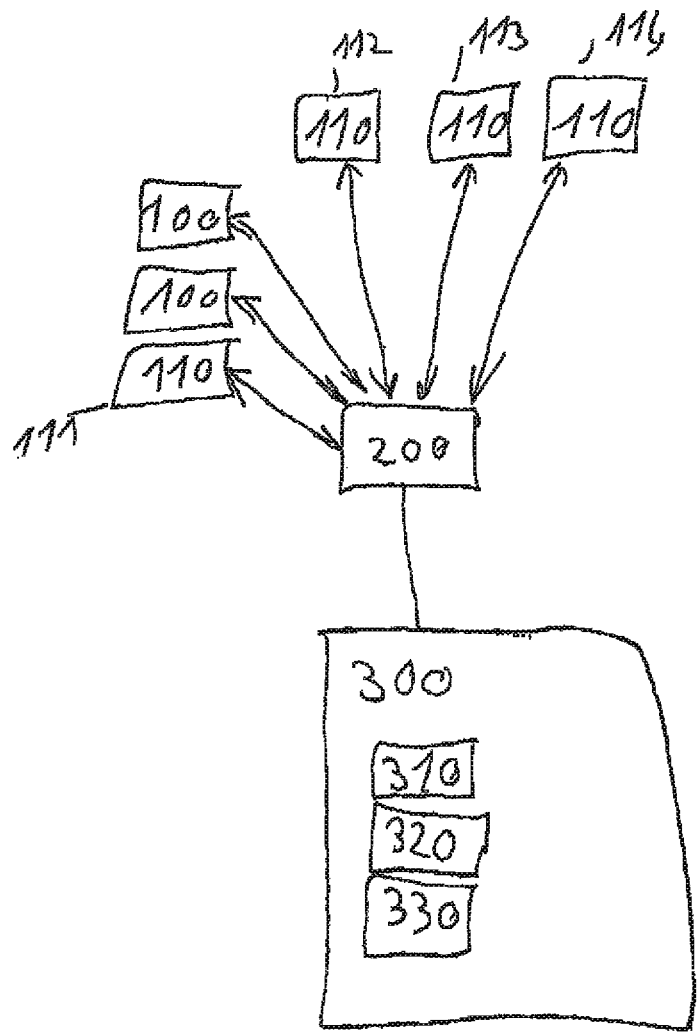
FIG. 1 shows a schematic block circuit diagram of a wireless frequency-modulated transmission system according to a first embodiment.

FIG. 1 shows a schematic block circuit diagram of a wireless radio transmission system according to a first embodiment. The wireless radio transmission system has a plurality of wireless transmitters 100, 110, at least one wireless receiver 200 and a central unit 300. The central unit 300 can also be implemented in the wireless receiver 200. The plurality of wireless transmitters 100, 110 can have a plurality of stationary wireless transmitters 110 which each have respective stationary positions 111-114. In addition thereto there can be a plurality of mobile wireless transmitters 100. All wireless transmitters (stationary or mobile) transmit for example audio signals wirelessly and in frequency-modulated fashion to the wireless receiver 200. The transmission frequencies of the respective wireless transmitters 100, 110 are established in the central unit 300.

The central unit 300 has a frequency assignment unit 310, optionally a position information unit 320 and an output unit 330. The output unit 330 serves to provide or output the respectively established frequencies for the transmission between the respective wireless transmitters and the wireless receiver to the respective wireless transmitters 100, 110. The position information unit 320 stores at least items of relative position information between adjacent stationary wireless transmitting units 110 and optionally the items of absolute position information. Based inter alia on those items of information the frequency assignment unit 310 can establish the transmission frequencies for the mobile and in particular the stationary wireless transmitters 110. If the relative position between adjacent stationary wireless transmitters 110 is not below a limit value possible intermodulation of the transmission frequencies does not have to be taken into account. That limit value can be for example 5 meters because, as from a spacing of 5 meters, present intermodulation products of two transmission frequencies no longer have any influence worth considering.

That assumption is adequate if it can be assumed that stationary wireless transmitters like for example stationary wireless microphones (which are used for example for backing singers) are actually stationary wireless transmitters and those wireless transmitters do not change in their position.

Figure 2A:
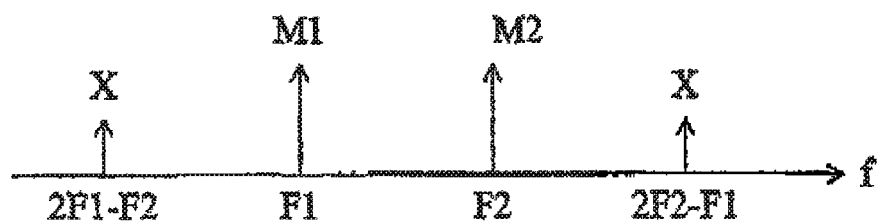
FIGS. 2A and 2B shows a graph to illustrate the use of the usable frequencies according to the invention.
Figure 2B:
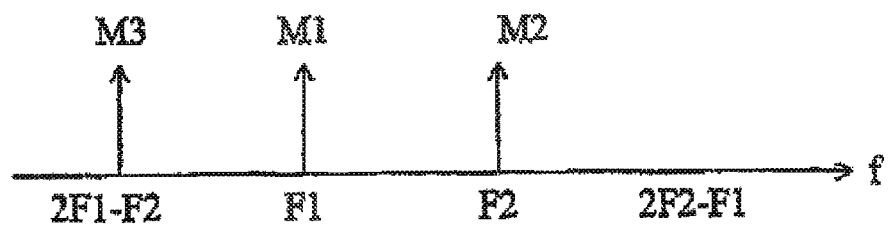

FIGS. 2A and 2B each show a graph view of frequency assignment according to the state of the art and according to the invention. FIG. 2A shows a situation according to the state of the art. In this case, in a wireless radio audio transmission system, a first microphone M1 can transmit on a first frequency F1 and second microphone M2 can transmit on a second frequency F2. If the two wireless transmitters of the first and second microphones M1 and M2 have non-linear transmitting terminals intermodulation products can occur if the two microphones M1, M2 spatially approach each other. Thus there can be intermodulation products at 2F1-F2 and 2F2-F1, that is to say those frequencies cannot be used for a further microphone. Thus, based on an exclusion of third-order intermodulation products there is a frequency assignment for N transmitters N·(N−1) of non-usable frequencies which cannot be employed because of possible intermodulation products. The consequence of this is that frequency utilization is considerably reduced with an increasing number of transmitters in order to avoid intermodulation products. The number of usable frequencies can further fall if a plurality of wireless microphones spatially approach each other or if the fifth-order intermodulation products are also taken into consideration.

FIG. 2B shows the situation according to the invention. In this case spatial and temporal items of information can also be taken into account from the respective applications for example of the wireless microphones. The aim in this respect is to dispose more wireless transmitting devices in a given frequency spectrum. If it is possible to be sure that the wireless transmitters in question do not come spatially closer to each other or are not activated at the same time it is then possible to avoid intermodulation with corresponding intermodulation products so that for example a third microphone can be operated at the frequency 2F1-F2. That can be effected for example if the microphone M3 is a stationary microphone (for example for backing singers). A further alternative provides that the microphone M3 has a restricted radius of action which is not in conflict with the first and second microphones M1 and M2. If it is possible on the basis of the information about the microphones M1-M3 to ensure that the three microphones cannot lead to intermodulation products throughout the entire period of operation then the frequency 2F1-F2 can be used by the microphone M3 although that frequency would previously not have been used.

It is thus possible according to the invention to ensure that the frequencies present are used more efficiently.

According to the invention the wireless transmitters typically have non-linear transmitting terminals. The use of those non-linear transmitting terminals provides that intermodulation occurs if two transmitters are operated with a small spatial distance relative to each other.

For example when constructing the wireless transmission system, that is to say the wireless microphones, the wireless microphones can be classified as mobile or stationary wireless transmitters. Those items of information can be stored for example in the position information unit 320 in the central unit. That classification of the respective wireless microphones admittedly represents an increase in complication and expenditure but the advantages achieved therewith, namely better utilization of the available frequency spectrum outweigh that increase, especially as that increase has to be incurred only when constructing the system.

The invention is based on the realization that wireless transmitters for wireless (radio) transmission systems can produce intermodulation products with each other if the transmission signal of a transmitter is mixed with the non-linear characteristic of another transmitter. In that case mixed or intermodulation products can be produced at further frequencies which can possibly interfere with other transmission paths. The signal level of the interfering transmitter and the spacing between the two transmitters influences the level of an intermodulation product. The level of the intermodulation products is reduced with a spacing of the transmitters relative to each other of for example between 0.75 m and 1 m. There is no longer any influence worth mentioning as from a spacing of 5 m.

When constructing the wireless transmitters or the wireless microphones it remains to be seen whether the wireless microphones are used as mobile or stationary wireless microphones. If the adjacent stationary wireless transmitters or wireless microphones observe a minimum spacing then the influence of intermodulation no longer has to be taken into consideration. In the case of the mobile wireless transmitters or wireless microphones however intermodulation must be taken into consideration because the mobile microphones are moved on the stage and can also come into the proximity of the other microphones. To provide for reliable transmission the mobile wireless transmitters or wireless microphones must be handled differently in regard to frequency control or frequency assignment or frequency establishment, from stationary wireless transmitters or wireless microphones which are at a spacing relative to each other which is above a limit value. In that case the limit value can be 5 m and should be at least greater than 0.75 or 1 m. If the stationary wireless transmitters or wireless microphones are at a relative spacing with respect to each other, which is less than 0.75 m, the possible intermodulation then has to be suitably taken into consideration in terms of frequency control.

In accordance with a second embodiment a distinction is drawn between a stationary or fixed and a mobile wireless transmitter or wireless microphone, in such a way that a stationary wireless transmitter represents a wireless transmitter which does not come too close to any other stationary wireless transmitter or wireless microphone (that is to say there is always a minimum spacing between two adjacent stationary wireless microphones). If that minimum spacing is observed no measurable intermodulation effects occur between the two wireless transmitters.

In a third embodiment operating zones are defined in which the respective mobile wireless transmitters or wireless microphones can move. If a plurality of stages or different zones have been established then only the wireless transmitters or wireless microphones in a zone must operate intermodulation-free and suitable frequency assignment has to be implemented. The wireless transmitters or wireless microphones in an adjacent zone can then be assigned to a transmission frequency at which intermodulation does not have to be further taken into consideration.

The invention concerns the notion of using items of spatial information in relation to the wireless transmitters or wireless microphones in order to identify wireless transmitters which cannot come spatially close (that is to say observe a minimum spacing relative to each other) and thus intermodulation does not have to be considered in frequency assignment. In an aspect of the invention the wireless transmitters or wireless microphones can be divided up into different groups. In that case frequency assignment of the wireless microphones within a group can be effected in such a way that intermodulation effects do not occur. The microphone of a further group can then be so adjusted that intermodulation does not occur among the microphones in that group. The paired intermodulation between microphones of different groups cannot occur and thus frequencies which would be affected by such intermodulation can nonetheless be used.

According to the invention a wireless transmission is implemented, which represents a wireless radio transmission. That transmission can represent a frequency-modulated transmission, an amplitude-modulated transmission or a transmission based on another modulation. The invention concerns in particular the frequency assignment, that is to say assignment of the transmitting and receiving frequencies for the wireless receivers and wireless transmitters.

According to the invention frequency assignment is to be effected automatically insofar as the required data are present. Division of the microphones for example into different groups, for example mobile/stationary or portion 1/portion 2, stage 1/stage 2 or the like can lead to those required data. In that respect it is necessary to take account of whether the respective wireless transmitters (for example wireless microphones) can come into spatial proximity with each other (that is to say for example <1 m). If that is the case then the transmitting/receiving frequencies of those wireless transmitters have to be suitable adapted. If however the wireless transmitters (wireless microphones) cannot involve spatial proximity with each other then for example the above-described intermodulation problems do not have to be considered and the assigned frequencies can be selected more tightly.

The present invention is particularly advantageous in relation to transmitters with non-linear transmitting amplifiers.

The present invention concerns in particular a wireless microphone transmission system and a method of frequency assignment in such a system.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

The invention claimed is:

1. A method for assigning frequencies to a wireless radio audio transmission system having (1) a plurality of wireless transmitters which each have at least one non-linear transmitting amplifier, and (2) at least one wireless receiver, comprising:

wirelessly transmitting audio signals from at least one wireless transmitter of the plurality of wireless transmitters to the at least one wireless receiver;

establishing a first wireless transmitter of the plurality of wireless transmitters which, in a switched-on condition, is configured to approach a third wireless transmitter below an established minimum spacing that would create an intermodulation effect;

establishing a second wireless transmitter which, in a switched-on condition, is not to approach another wireless transmitter below the minimum spacing;

assigning a first transmission frequency to the first wireless transmitter and a third transmission frequency to the third wireless transmitter, having regard to possible intermodulation effect; and assigning a second transmission frequency, corresponding to an intermodulation frequency of the first and third frequencies, to the second wireless transmitter.

2. The method as set forth in claim 1, further comprising:
establishing a position or a position region of each of the wireless transmitters;
wherein assignment of the first and second transmission frequencies is effected having regard to the position or the position region of each of the wireless transmitters.

3. The method as set forth in claim 1, further comprising:
identifying those wireless transmitters of the plurality of wireless transmitters which are always at a minimum distance relative to each other; and
assigning transmission frequencies for each of the identified wireless transmitters without regard to intermodulation of the transmission frequencies.

4. The method as set forth in claim 1, further comprising:
establishing whether a wireless transmitter of plurality of wireless transmitters represents a type of transmitter selected form the group consisting of stationary transmitters, spatially limited transmitters, and wireless transmitters.

5. The method as set forth in claim 4;
wherein the first wireless transmitters are mobile wireless transmitters;
wherein the second wireless transmitters are adjacent stationary wireless transmitters which, in the switched-on condition, observe an established minimum distance relative to the adjacent wireless transmitter.

6. A method of frequency assignment of wireless radio audio transmission systems having (1) at least a first and a second wireless transmitter which each have at least one respective non-linear transmitting amplifier, and (2) at least one wireless receiver for receiving the audio signals transmitted from the wireless transmitters, comprising the steps:
wirelessly transmitting audio signals on a first frequency from the first wireless transmitter to the at least one wireless receiver;
assigning a second frequency to the second wireless transmitter;
assigning a third frequency to a third transmitter when the first and second transmitters, in a switched-on condition, observe a minimum spacing relative to each other;
wherein the third frequency corresponds to an intermodulation frequency of the first and second frequencies.

7. The method as set forth in claim 6;
wherein the third transmitter, in a switched-on condition, observes a minimum spacing relative to at least one of the first and second transmitters.

8. A wireless radio audio transmission system comprising:
a first wireless transmitter which has at least one non-linear transmitting amplifier configured to wirelessly transmit an audio signal, where the first wireless transmitter, in a switched-on condition, is configured to approach a third wireless transmitter below an established minimum spacing that would create an intermodulation effect;
a second wireless transmitter which, in a switched-on condition, is not to approach another wireless transmitter below the minimum spacing;
at least one wireless receiver configured to receive the audio signals wirelessly transmitted from the first and second wireless transmitters; and
a central unit which has a frequency assignment unit configured to:
assign a first transmission frequency to the first wireless transmitter and a third transmission frequency to the third wireless transmitter, having regard to possible intermodulation effects; and
assign a second transmission frequency, corresponding to an intermodulation frequency of the first and third frequencies, to the second wireless transmitter.

9. A method for allocating radio transmission frequencies for a particular application of a wireless audio transmission system having a plurality of wireless transmitters, each for wirelessly transmitting modulated audio signals via a corresponding radio transmission frequency that is individually assigned to each of the wireless transmitters, to at least one wireless receiver;
wherein the wireless transmitters are designed such that a reduction of the spatial distance between a first one of the wireless transmitters and a second one of the wireless transmitters below a minimum value in a switched-on condition causes the first and second wireless transmitter to emit intermodulation products between their two assigned radio transmission frequencies, the intermodulation products having at least one intermodulation frequency;
the method comprising the steps of:
acquiring distance information according to which the spatial distance between said first and second wireless transmitters in the switched-on condition won't fall below a predetermined minimum value inside of the particular application of the wireless audio transmission system;
allocating radio transmission frequencies to the plurality of wireless transmitters for the particular application, wherein the acquired distance information is taken into account in such a way, that said at least one intermodulation frequency is assigned to one of the plurality of the wireless transmitters.

10. A wireless audio transmission system comprising a plurality of wireless transmitters,
wherein each of the plurality of wireless transmitters wirelessly transmits modulated audio signals, via a corresponding radio transmission frequency that is individually assigned to each of the wireless transmitters, to at least one wireless receiver;
wherein the wireless transmitters are designed such that a reduction of the spatial distance between a first one of the wireless transmitters and a second one of the wireless transmitters below a minimum value in a switched-on condition causes the first and the second wireless transmitters to emit intermodulation products between their two assigned radio transmission frequencies, the intermodulation products having at least one intermodulation frequency; and
wherein the radio transmission frequencies are allocated to the wireless transmitters according to the method of claim 9.

* * * * *

UNITED STATES PATENT AND TRADEMARK OFFICE
CERTIFICATE OF CORRECTION

| | |
|---|---|
| PATENT NO. | : 9,615,175 B2 |
| APPLICATION NO. | : 14/036103 |
| DATED | : April 4, 2017 |
| INVENTOR(S) | : Sebastian Georgi |

It is certified that error appears in the above-identified patent and that said Letters Patent is hereby corrected as shown below:

On the Title Page

Please correct Item (73) the Assignee to read -- Sennheiser electronic GmbH & Co. KG -- instead of "Sennheiser electric GmbH & Co. KG"

Signed and Sealed this
Sixteenth Day of May, 2017

Michelle K. Lee
*Director of the United States Patent and Trademark Office*